United States Patent [19]
Ichizawa et al.

[11] Patent Number: 5,900,899
[45] Date of Patent: May 4, 1999

[54] INK UNIT FOR USE IN INK JET RECORDING AND INK JET RECORDING METHOD

[75] Inventors: Nobuyuki Ichizawa; Toshitake Yui; Atsushi Suzuki; Kunichi Yamashita; Ken Hashimoto, all of Minami-ashigara, Japan

[73] Assignee: Fuji Xerox Co., Ltd., Tokyo, Japan

[21] Appl. No.: 08/859,275

[22] Filed: May 20, 1997

[30] Foreign Application Priority Data

May 27, 1996 [JP] Japan .................................. 8-132425

[51] Int. Cl.$^6$ .................................................. C09D 11/02
[52] U.S. Cl. .................. 347/100; 106/31.86; 106/31.87
[58] Field of Search .......................... 347/100; 106/31.86, 106/23 C

[56] References Cited

U.S. PATENT DOCUMENTS

| | | | |
|---|---|---|---|
| 5,085,698 | 2/1992 | Ma et al. ................................ | 524/388 |
| 5,172,133 | 12/1992 | Suga et al. ............................. | 347/100 |
| 5,519,085 | 5/1996 | Ma et al. ................................ | 524/503 |
| 5,531,818 | 7/1996 | Lin et al. ............................... | 106/23 C |
| 5,662,734 | 9/1997 | Crystal .................................. | 106/31.75 |
| 5,713,993 | 2/1998 | Guzzo Page et al. ............... | 106/31.85 |

FOREIGN PATENT DOCUMENTS

| | | |
|---|---|---|
| B2-4-33309 | 6/1992 | Japan . |
| A-5-320551 | 12/1993 | Japan . |
| A-7-53841 | 2/1995 | Japan . |
| A-7-145336 | 6/1995 | Japan . |

OTHER PUBLICATIONS

Webster's II New Riverside University Dictionary, The Riverside Publishing Company, pp. 75 and 1159, 1994.

*Primary Examiner*—Benjamin R. Fuller
*Assistant Examiner*—Christina Annick
*Attorney, Agent, or Firm*—Oliff & Berridge PLC

[57] ABSTRACT

The present invention provides an ink unit for use in an ink jet recording which can provide color images with high water resistance, no print bleeding, and an excellent color reproduction of shades, together with rub resistance, and also can render color images on ordinary paper clearly and stably, and an ink jet recording method using the ink unit, wherein the ink, unit which has a black ink and a color ink, comprises pigments, a polymeric dispersant, and water, wherein a black ink contains a black pigment and a first polymeric dispersant including a COOH group or the salt thereof (acrylic acid salts, methacrylic acid salts, and the like) and a color ink contains a chromatic pigment and a second polymeric dispersant including a $SO_3H$ group or the salt thereof (vinyl sulfonic acid salts, naphthalene sulfonic acid salts, and styrenesulfonic acid salts).

14 Claims, No Drawings

INK UNIT FOR USE IN INK JET RECORDING AND INK JET RECORDING METHOD

BACKGROUND OF THE INVENTION

1. Field of the Invention

The present invention relates to an ink unit for use in ink jet recording and an ink jet recording method and, more particularly, relates to a unit comprising an ink jet recording black ink and an ink jet recording chromatic color ink, and an ink jet recording method using this unit.

2. Description of the Related Art

So-called ink jet printers capable of recording images on paper, cloth, or film by discharging a liquid or molten solid ink through nozzles, slits, porous film, and the like have various advantages such as small size, low cost, low noise, and the like. In particular, a black monochrome printer is commercially available as a printer which can provide excellent printing quality on so-called ordinary paper such as report paper, copy paper, and the like. With the wide dissemination of this ink jet printer, various investigations have been undertaken with regard to the improvement of ink.

An ink for use in an ink jet printer has been studied taking into consideration the following five points:

(1) On paper, an uneven image with high resolution, high optical density, no bleeding, and no fogging can be obtained;
(2) The tip of a nozzle is not clogged with dried ink, allowing the ink to provide excellent discharge responsiveness and discharge stability;
(3) The ink dries quickly on sheet;
(4) The resulting image has excellent fastness; and
(5) The ink has excellent storage stability for a long period of time.

Various suggestions have conventionally been made regarding an ink for use in an ink jet printer to satisfy the above-mentioned requirements.

Aqueous dye inks have conventionally been used mainly as an ink jet ink. However, the aqueous dye ink has problems with regard to water resistance and lightfastness because the dye thereof is water-soluble so that the storage stability of the resultant image is not always satisfactory. On the other hand, inks which use a pigment improving water resistance and lightfastness as a coloring material are very useful, and many suggestions have been made regarding such color-pigment-containing inks, and have been practiced. For example, U.S. Pat. No. 5085698 suggests the use of an AB or BAB block copolymer as a dispersant, and U.S. Pat. No. 5172133 suggests the use of specific dyes, water-soluble resins, and solvents.

However, there are problems of poor color development property and marked unevenness on ordinary paper in printing, even though the color-pigment-containing ink has high waterfastness. Further, since the pigment particle components do not permeate but remain on the surface of ordinary paper, there is a problem regarding rub resistance due to rub on the surface. Further, the color-pigment-containing ink dries relatively slowly. Therefore, since the color ink comes in contact with other color ink which exists adjacent to it in a liquid state during drying, the bleeding thereof becomes a problem. In particular, when a full-color-pigment-containing ink is used, a poor color reproduction of shades and unevenness caused on ordinary paper are serious problems.

SUMMARY OF THE INVENTION

The first object of the present invention is to provide a color ink unit for use in ink jet recording which improves the color reproduction of shades and unevenness in printing, together with providing the rub resistance of a black ink and reduced print bleeding of a black ink into an adjacent color and provides excellent image quality and waterfastness of the image.

The second object of the present invention is to provide an ink jet recording method which can clearly and stably produce a full-color image on ordinary paper.

The present inventors have attained the above-mentioned first object by using the following ink unit for use in ink jet recording: An ink unit for use in ink jet recording comprising a black ink and a color ink in which the respective inks are ink jet recording inks each essentially containing a pigment, a polymeric dispersant, and water; the polymeric dispersant of the black ink has a COOH group or the salt thereof; and the polymeric dispersant of the color ink has a $SO_3H$ group or the salt thereof.

Further, the present inventors have attained the above-mentioned second object by the following ink jet recording method: An ink jet recording method discharges ink droplets from orifices according to recording signals, wherein the above-mentioned ink unit comprising a black ink and a color ink uses these inks as the ink.

When the black ink and color ink of the ink unit of the present invention are used, it is possible to attain the above-mentioned objects concerning the color reproduction of shades and concentration uniformity of an aqueous pigment ink and rub resistance, and to form on ordinary paper full-color printing images which cause no print bleeding and have rub resistance and an excellent color reproduction of shades, with retaining the characteristic of the aqueous pigment ink that it is highly water-resistant.

Therefore, the ink unit of the present invention can form clear color images having high resolution and high water resistance on ordinary paper such as report paper, copy paper, bond paper, wood-free paper, or the like. Further, the ink unit of the present invention is suitable as an ink for ink jet recording using a thermal ink jet method, piezoelectric method, ultrasonic, electrical field, or the like, and, in particular, is suitable as an ink which can provide highly water-resistant full-color images clearly and stably on ordinary paper.

DESCRIPTION OF THE PREFERRED EMBODIMENT(S)

The present invention will be illustrated below.

The color pigment dispersed ink of the present invention essentially contains water, a pigment, and a polymeric dispersant, and can optionally contain a water-soluble organic solvent, surfactant, pH regulator, hydrotropy agent, chelating agent, inclusion compound, oxidizing agent, anti-oxidizing agent, reducing agent, enzyme, germicide, defoaming agent, grinding agent, and other additives.

Preferably, the water used in the present invention is ion-exchanged water, ultrapure water, distilled water, and ultrafiltrated water because of their exclusion of impurities.

Examples of the pigment in the present invention include inorganic pigments such as zinc oxide, titanium white, chromium oxide, iron oxide, alumina white, cadmium yellow, zinc sulfide, zinc chromate, chrome yellow, barium sulfate, basic lead sulfate, calcium carbonate, lead white, ultramarine blue, calcium silicate, manganese violet, cobalt violet, Prussian blue, carbon black, and the like; organic pigments such as madder lake, cochineal lake, naphthol green B, naphthol green Y, naphthol yellow S, permanent red 4R, hansa yellow, benzidine yellow, lithol red, lake red C, lake red D, brilliant carmine 6B, bordeaux 10B, phthalocyanine blue, phthalocyanine green, sky blue, rhodamine lake, methyl violet lake, quinoline yellow lake, peacock blue lake, thioindigo maroon, alizarin lake, quinacrydone red, perylene red, aniline black, dioxazine violet, organic fluorescent pigment, isoindolinone yellow, and the like; magnetic materials or superparamagnetic materials such as cobalt oxide, γ-iron oxide, metal iron powder, magnetite such as barium ferrite, and the like, ferrite, and the like; other plastic pigment and metal gloss pigment; and the like. The pigment of the present invention may be any pigment without being limited to the above-listed compounds, and can be selected according to the hue used. Also, one or more well-known dyes can be mixed with the pigments.

Examples of the pigment in the case of providing full four-color printing images are listed below as, but are not limited to, trade names and C. I pigment numbers.

Examples of a black pigment include, but are not limited to, carbon black pigments such as furnace black, lamp black, acetylene black, channel black, and the like, and, more particularly, include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, and Raven 1255 (the above-mentioned compounds are manufactured by Columbian Carbon Corp.); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (the above-mentioned compounds are manufactured by Cabot Corp.); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (the above-mentioned compounds are manufactured by Degussa Corp.); No. 25, No. 33, No. 40, No. 47, No. 52, No. 900, No. 2300, MCF-88, MA600, MA7, MA8, and MA100 (the above-mentioned compounds are manufactured by Mitsubishi Chemical Corp.); and the like.

Examples of a cyan pigment include, but are not limited to, C. I. Pigment Blue 1, C. I. Pigment Blue 2, C. I. Pigment Blue 3, C. I. Pigment Blue 15:3, C. I. Pigment Blue 15:34, C. I. Pigment Blue 16, C. I. Pigment Blue 22, C. I. Pigment Blue 60, and the like.

Examples of a magenta pigment include, but are not limited to, C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red 168, C. I. Pigment Red 184, C. I. Pigment Red 202, and the like.

Examples of a yellow pigment include, but are not limited to, C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. PigmentYellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 128, C. I. Pigment Yellow 129, C. I. Pigment Yellow 151, C. I. Pigment Yellow 154, and the like. Further, the pigment may be a pigment newly synthesized for the present invention.

The content of these pigments is from 0.3 to 20% by weight, preferably from 1 to 8% by weight based on the total amount of the ink. The particle size of the pigments is from 1 nm to 500 nm, preferably from 15 nm to 100 nm in terms of a primary particle. The particle size after dispersion is from 10 nm to 500 nm, preferably from 20 nm to 200 nm. Further, these pigments may be used in admixtures of two or more.

The measurement of the primary particle can be conducted by using an electron microscope or an adsorption method using a gas or solute, an air flow-through method, an X-ray small-angle scattering method, and the like. The measurement of particle size after dispersion can be conducted by a commercially available centrifugal sedimentation method, a laser diffraction method (light-scattering method), an ESA method, a capillary method, an electron microscope method, and the like. Preferably, the measurement is conducted by using a UPA 9340 manufactured by Microtrack Corp. using a kinetic light scattering method.

Also, before a pigment is used, the surface of the pigment can be treated. The treatment employed includes surface treatment with alcohols such as ethanol, propanol, and the like; treatment with surfactants; pigment derivative treatment comprising a step of substituting acidic groups and basic groups; pigment coating reaction treatment comprising a step of coating the surface of a pigment with another substance; surface chemical reaction treatment comprising a step of introducing substituents by a condensation reaction and graft reaction; coupling reaction treatment comprising a step of treating the surface of the pigment with a silane-based coupling agent, titanate-based coupling agent, zirconate-based coupling agent, aluminate-based coupling agent, and the like; plasma reaction treatment; CVD treatment; and the like.

Further, a pigment can also be used, if desired, after the pigment is washed and purified. Commercially available pigments contain organic and inorganic impurities in large amounts, particularly, impurities such as water-insoluble, poorly water-soluble, or poorly dispersing polyvalent metal cations, Si-based compounds, and P-based compounds. Since these impurities adversely affect the clogging of ink in nozzles, so-called kogation, storage stability, recording reliability, and the like, a pigment is used, if desired, after the pigment is washed and purified in order to remove these impurities. Examples of the removing method include filtering, centrifugal sedimentation, a separation membrane method, an ion exchange resin treatment method, a reverse osmosis method, an activated charcoal method, a zeolite method, water washing, solvent extraction, and the like.

The polymeric dispersant for a black ink may use any compound having a COOH group or the salt thereof in the molecule. A polymer having a hydrophilic part and hydrophobic part is advantageous as a polymeric dispersant.

The polymeric dispersant is a homopolymer of a hydrophilic monomer component comprising a hydrophobic part which bonds to the surface of a pigment particle and a hydrophilic part which has a COOH group or the salt thereof, or a copolymer of a hydrophobic monomer component and a hydrophilic monomer component having a COOH group or the salt thereof. Also, if desired, other components can be copolymerized. The copolymer may be of any structure such as random, graft, block, or the like. Examples of these salts include, but are not limited to, oxonium compounds such as hydrogen, alkaline metal, ammonium ion, sulfonium ion, oxonium ion, stibonium ion, stannonium, iodonium, and the like.

Examples of the hydrophilic monomer component having a COOH group include α,β-ethylenically unsaturated carboxylic acids and aliphatic alcohol esters thereof, acrylic acid, acrylic acid derivatives, methacrylic acid, methacrylic acid derivatives, maleic acid, maleic acid derivatives, itaconic acid, itaconic acid derivatives, fumaric acid, fumaric acid derivatives, and the like. The preferable hydrophilic monomer components are acrylic acid, acrylic acid derivatives, methacrylic acid, methacrylic acid derivatives, and acrylic acid salts, and methacrylic acid salts are particularly preferable.

Examples of the hydrophobic monomer component include styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkylesters of acrylic acid, alkylesters of methacrylic acid, and the like. The preferable hydrophobic monomer components are styrene, styrene derivatives, alkyl acrylates, alkyl methacrylates, and the like. The number of carbon atoms in the alkyl group is in the range from 1 to 10, preferably from 1 to 6.

Examples of other components include acrylamide, acrylamide derivatives, dimethylaminoethyl methacrylate, ethoxyethyl methacrylate, butoxyethyl methacrylate, ethoxytriethylene methacrylate, vinylpyrrolidone, vinylpyridine, and alkyl ethers; components containing polyoxyethylene, for example, methoxypolyethylene glycol methacrylate; and components containing a hydroxyl group, for example, vinyl alcohol, and the like.

In addition to the above-described compounds, a polymeric dispersant may also be a polymeric dispersant obtained by addition-polymerization of a hydrophilic monomer component with a polymer having a hydrophobic component which is a condensated polymer of a unsaturated carboxylic acid and alcohols or glycols (polyester-based condensated polymer). In addition to the above-described compounds, water-soluble polymers such as a carboxyl group-modified polyvinyl alcohol, carboxymethyl cellulose, and the like can be used, and there is no limitation to the above-mentioned.

The content of the monomer component having a COOH group or the salt thereof is in the range from 0.1% to 100% by mol, preferably from 30% to 100% by mol. The corresponding acid value is in the range from 100 to 800, preferably from 150 to 800.

The color polymeric dispersant may use any compound having a $SO_3H$ group or the salt thereof. A polymer comprising a hydrophilic part and a hydrophobic part is advantageous as the polymeric dispersant. The polymeric dispersant is a homopolymer of a hydrophilic monomer component comprising a hydrophobic part which bonds to the surface of a pigment particle and a hydrophilic part which has a $SO_3H$ group or the salt thereof, a copolymer of a hydrophobic monomer component and a hydrophilic monomer component having a $SO_3H$ group or the salt thereof, or a polymer obtained by sulfonating a homopolymer of a hydrophobic monomer component or a copolymer of two or more hydrophobic monomer components or the salt thereof to impart hydrophilicity. Further, other components can be optionally copolymerized. The copolymer may be of any structure such as random, graft, block, or the like. Examples of these salts include, but are not limited to, oxonium compounds such as hydrogen, alkaline metal, ammonium ion, sulfonium ion, oxonium ion, stibonium ion, stannonium, jodonium, and the like.

Examples of the hydrophilic monomer component having a $SO_3H$ group include styrenesulfonic acid, styrenesulfonic acid derivatives, benzenesulfonic acid, benzenesulfonic acid derivatives, naphthalenesulfonic acid, naphthalenesulfonic acid derivatives, toluenesulfonic acid, toluenesulfonic acid derivatives, vinylsulfonic acid, vinylsulfonic acid derivatives, and the like. The preferable hydrophilic monomer components are vinylsulfonic acid, vinylsulfonic acid derivatives, naphthalene sulfonic acid, naphthalene sulfonic acid derivatives, styrenesulfonic acid and styrenesulfonic acid derivatives, and vinylsulfonic acid salts; naphthalenesulfonic acid salts and styrenesulfonic acid salts are particularly preferable.

Examples of the hydrophobic monomer component include styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkylesters of acrylic acid, alkylesters of methacrylic acid, and the like. The preferable hydrophobic monomer components are styrene, styrene derivatives, vinylnaphthalene and vinylnaphthalene derivatives.

Examples of other components include acrylamide, acrylamide derivatives, dimethylaminoethyl methacrylate, ethoxyethyl methacrylate, butoxyethyl methacrylate, ethoxytriethylene methacrylate, vinylpyrrolidone, vinylpyridine, and alkyl ether; components containing polyoxyethylene, for example, methoxypolyethylene glycol methacrylate; and components containing a hydroxyl group, for example, vinyl alcohol, and the like.

In addition to the above-described compounds, the polymeric dispersant may use a polymeric dispersant obtained by addition-polymerization of a hydrophilic monomer component with a polymer having a hydrophobic component which is a condensated polymer of a unsaturated carboxylic acid and alcohols or glycols (polyester-based condensated polymer).

Any polymeric dispersant of a black ink and color ink having from 1,000 to 10,000, preferably from 2,000 to 7,000, of the weight-average molecular weight may obtain excellent dispersion. When the molecular weight is less than 1,000, the dispersion stability tends to be unstable, and the polymeric dispersant sometimes tends to be aggregated. On the other hand, when the molecular weight is more than 10,000, dispersion stability tends to be unstable, and the viscosity of an ink increases. As a result, unpreferable phenomena such as unstable discharging and clogging in nozzles occur. The weight-average molecular weight can be measured by a light-scattering method, an X-ray small-angle scattering method, a sedimentation equilibrium method, a diffusion method, an ultracentrifugal method, and various chromatographies, for example, a GPC method. The content of the polymeric dispersant is in the range from 0.1 to 30% by weight, preferably from 0.3 to 8% by weight based on the total amount of the ink.

The content of the monomer component having a COOH group or the salt thereof is in the range from 0.1 to 100% by mol, preferably from 30 to 100% by mol. Further, the corresponding acid value is in the range from 100 to 500. Specific examples thereof include, but are not limited to, polystyrenesulfonic acid, polystyrenesulfonic acid derivatives, formalin condensates of naphthalenesulfonic acid, sulfonic group-modified polyvinyl alcohol, and the like.

The preferable ratio of the polymeric dispersant to the pigment for both of a black ink and a color ink depends on the particle size, specific surface area, surface structure, and the like of the pigment, and is approximately in the range from 10:8 to 10:0.5 in terms of ratio by weight of pigment-:dispersant. The dispersing machine employed in the present invention may be a conventional dispersing machine. Examples thereof include a ball mill, roll mill, sand mill, homomixer, sand grinder, speedline mill, microfluidizer, ultrasonic homogenizer, and the like.

Water-soluble organic solvents may use polyhydric alcohols and derivatives thereof such as alkyl ethers in order to prevent the setting of ink. Examples of the water-soluble organic solvent include glycerin, polyethylene glycol, polypropylene glycol, diethylene glycol, BCBT (2(2butoxyethoxy)ethanol), diethylene glycol phenyl ether, propylene glycol, propylene glycol monomethyl ether, butylene glycol, triethylene glycol, thio diglycol, hexylene glycol, ethylene glycol methyl ether, diethylene glycol methyl ether, pentanediol, hexanetriol, trimethylolpropane, and the like. These may be used alone or in admixtures of two or more. These water-soluble organic solvents are preferably used in an amount in the range from 0.01 to 50% by weight, preferably from 1 to 30% by weight based on the total amount of the ink.

In addition to the above-mentioned compound, examples of the water-soluble organic solvent used include, but are not limited to, alcohols such as methyl alcohol, ethyl alcohol, n-propyl alcohol, isopropyl alcohol, n-butyl alcohol, hexyl alcohol, benzyl alcohol, and the like; amides such as dimethylformamide, dimethylacetamide, and the like; ketone and ketoalcohols such as acetone, diacetone alcohol, and the like; nitrogen-containing solvents having a high boiling point such as triethanolamine, diethanolamine, pyrrolid one, n-methyl-2-pyrrolidone, 1,3-dimethyl-2-imidazolidinone, and the like; sulfur-containing solvents such as dimethyl sulfoxide, diethyl sulfoxide, sulfolane, thiodiethanol, and the like; and polysaccharides such as amylose (dextrin), cellulose, gum arabic, sodium alginate, and the like. These water-soluble organic solvents can also be used alone or in admixtures of two or more. These water-soluble organic solvents are desirably used in an amount in the range from 0.01 to 50% by weight, preferably from 0.1 to 20% by weight based on the total amount of the ink.

Further, if desired, various well-known surfactants may be added. The surfactant may use any one of nonionic, anionic, cationic or ampholytic surfactants.

Examples of the nonionic surfactant include polyoxyethylenenonylphenyl ether, polyoxyethyleneoctylphenyl ether, polyoxyethylenedodecylphenyl ether, polyoxyethylenealkyl ether, polyoxyethylenefatty ester, sorbitan fatty ester, polyoxyethylene/polyoxypropylene block copolymer, polyoxyethylene sorbitan fatty ester, fatty alkylolamide, acetylene glycol derivatives (Surfinol), and the like.

Examples of the anionic surfactant include alkylbenzene sulfonates, alkylnaphthalene sulfonates, form alin condensates of alkylnaphthalenesulfonates, higher fatty acid salts, sulfate salts of higher fatty esters, sulfonate salts of higher fatty esters, sulfate salts and sulfonate salts of higher alcohol ethers, alkylcarboxylate salts of higher alkylsulfonic amides, sulfosuccinic acid, the ester salts thereof, alkylphosphite salts, alkyiphosphate salts, alkylphosphonate salts and esters, higher alcohol phosphate salts, and the like.

As the cationic surfactant, primary, secondary, tertiary amine salts, quaternary ammonium salts, and the like are listed, and as the ampholytic surfactant, betaines, sulfobetaines, and sulfatebetaines are listed. In addition to the above-mentioned compounds, there are sted silicone-based surfactants such as a polysiloxanepolyoxyethylene adduct and the like; fluorine-based surfactants such as perfluoroalkylcarboxylic acid, perfluoroalkyl sulfonic acid, oxyethyleneperfluoroalkyl ether, and the like; and natural or biosurfactants such as lecithin, spicryspallic acid, rhamnolipid, saponin, cholic acid, and the like.

These surfactants may be used alone or in admixtures of two or more. These surfactants are preferably used in an amount in the range from 0.01 to 20% by weight of the total amount of the ink, and preferably in an amount equal to or more than the critical micelle concentration inherent in the surfactant.

As the other additives, there are hydrotropy agents. Examples of the hydrotropy agent include carboxylates such as sodium butyrate, sodium salicylate, and the like; aromatic sulfonates such as sodium toluenesulfonate, and the like; lower alcohols such as ethyl alcohol and the like; and urea, acetamide, and the like.

Examples of the chelating agent include ethylenediamine tetraacetic acid (EDTA), iminodiacetic acid (IDA), ethylenediamine-di(o-hydroxyphenyl acetic acid) (EDDHA), nitrilotriacetic acid (NTA), dihydroxyethylglycine (DHEG), trans-1,2-cyclohexanediaminetetra acetic acid (CyDTA), diethylenetriamine-N,N,N',N",N"-pentaacetic acid (DTPA), glycol ether diamine-N,N,N',N'-tetraacetic acid (GEDTA), and the like.

Examples of the inclusion compound include urea, thio urea, desoxycholic acid, bis-(N,N'-tetramethylenebenzidine), cyclophane, cyclodextrin, and the like, and preferable examples include urea and cyclodextrin.

Further, if desired, the pH of a black ink and/or a color ink can be controlled. In the black ink, a higher pH is suitable to obtain solubility of the dispersant. In this case, the preferable pH value is from 8 to 11, because a pH value exceeding 12 adversely affects corrosion, dissolution, and pealing of print head materials. In the color ink, a higher pH value is not required because of the high solubility of the dispersant, and pH values may be in the range from 6 to 11, and preferably in the range from 6 to 9, to suppress adverse effects on head print materials. Also, to prevent the print bleeding due to contact between the black ink and the color ink during printing, it is essential that the pH value of the black ink be higher than that of the color ink. Examples of the pH regulator include alkalis such as sodium hydroxide, potassium hydroxide, lithium hydroxide, sodium sulfate, acetate, lactate, benzoate, triethanolamine, ammonia, 2-amino-2-methyl-1-propanol (AMP), ammonium phosphate, sodium phosphate, lithium phosphate, and the like; and organic acids or inorganic acids such as acetic acid, hydrochloric acid, nitric acid, sulfuric acid, phosphoric acid, propionic acid, P-toluenesulfonic acid, and the like. Further, other usual pH buffering agents and good buffering agents are listed. However, the pH regulator is not limited to them.

Further, a resin emulsion may optionally be added. Examples thereof include acrylic resin emulsions, vinyl acetate-based resin emulsions, vinyl chloride-based resin emulsion, acryl-styrene-based resin emulsions, butadiene-based resin emulsions, styrene-based resin emulsions, and the like.

In addition to the above-described compounds, there can optionally be added an oxidizing agent, antioxidizing agent, reducing agent, enzyme, germicide, defoaming agent, grinding agent, and other additives.

In the present invention, the surface tension of the black ink is suitably in the range from 30 to 65 dyn/cm at 20° C., and the surface tension of the color ink is suitably in the range from 20 to 40 dyn/cm at 20° C. On the other hand, the viscosity is suitably in the range from 1 to 8 cP, more preferably 1 to 5 cP, at 20° C. in both the black ink and color ink. Unpreferably, a viscosity of more than 8 cP causes unstable discharging.

It is desirable that the content of inorganic impurities in respective inks be minimal because they adversely affect nozzle clogging, kogation, storage stability, recording reliability, and the like. It is desirable that each content of polyvalent metal cations, Si-based compounds, and P-based compounds be equal to or lower than 100 ppm, preferably equal to or lower than 10 ppm, more preferably equal to or lower than 5 ppm.

The black ink is required to not lower printing quality and to have successful paper permeation ability in actual use. On the other hand, it is desirable that the color ink have higher paper permeation speed, since fixing the color ink on paper in a shorter time could prevent aggregation of the pigments on paper and improve the color reproduction of shades. Under ordinary conditions, it is desirable that the permeation speed of the color ink be higher than that of the black ink.

The ink of the present invention can provide excellent printing quality by using any type of ink jet apparatus. For example, the above-described inks are used as a black ink and a color ink in a recording method by discharging ink droplets through orifices according to recording signals in recording. The ink of the present invention can be preferably used also to provide excellent images in a recording method in which inks are discharged particularly using a heating means. Further, there can also be used a means having the ability to heat paper to be recorded and inks at from 50 to 200° C. before, during, or after printing and to promote printing fixing. In addition to methods which print directly on ordinary paper, glossy paper, special paper, cloth, film, OHP transparencies, and the like, a method may also be adopted, comprising the steps of: printing images on an intermediate drum, belt, and the like; images being corrected on the intermediate; images being transferred to be printed on paper, cloth, film, and the like.

The pigment ink prepared as described above satisfies all conditions required in forming clear color images having high resolution on ordinary paper, has an excellent color reproduction of shades, can provide images having no unevenness on ordinary paper, and can realize printing having waterfastness and excellent in rub resistance.

In particular, the color-pigment-containing ink provides a good color reproduction of shades on ordinary paper, and excellent images having no unevenness. This is not clearly bound to theory, however, as the inventors hypothesize that a poor color reproduction of shades and unevenness occur because of the low solubility of a dispersant in water on ordinary paper to aggregate pigments. Unevenness is not clear in the case of monocolor, while, it is markedly observed in the case of full-color images containing many secondary colors due to the overlap of respective color unevennesses in such images. In the present invention, using a polymeric dispersant having a $SO_3H$ group in the color ink can prevent the disadvantage of the low solubility of the dispersant on ordinary paper and the aggregation of pigments, so that excellent color reproduction of shades and images having no unevenness can be obtained.

Further, the rub resistance of an ink, particularly a black ink, becomes a problem when a marking pen is applied to printed documents, the marking pen is often applied on black characters. The inventors hypothesize that this phenomenon occurs because the printed ink is redissolved in marking pen ink when the marking pen is applied on printed characters. However, the inventors surmise that the present invention, employing a polymeric dispersant in the black pigment ink having a COOH group, so that the ink has low solubility in the marking pen ink when it is applied, can prevent redissolution and images having high rub resistance can be obtained.

There is a secondary effect that, in the contact of the black ink with the color ink, because of the lower pH of the dispersant for the color ink, the solubility of the dispersant for the black ink is lowered and bleeding in the contact part is inhibited.

These phenomena are manifested only in the case of the combination according to the present invention, and are remarkably effective, particularly when high image quality is controlled in forming full-color images.

EXAMPLES

The present invention will be illustrated by examples and comparative examples.

Inks obtained in the respective examples and comparative examples were subjected to (1) image quality tests and (2) rub resistance evaluation tests, and the results were examined.

(1) Image quality test

Inks prepared in examples and comparative examples were subjected to a printing test by using a full-color ink jet printer prototyped by Fuji Xerox Corp. (600 spi) which discharges an ink using a heating means. Papers used were FX-L paper as typical ordinary paper and HP Premium Transparency Film (manufactured by Hewlett Packard Corp.) as OHP transparencies. Further, as a reference, glossy paper, HP Premium Glossy Paper (manufactured by Hewlett Packard Corp.), was used. As evaluation items, the color uniformity of solid images and the bleeding of black line images on color images were examined. Organoleptic tests were conducted by ten people according to the following criteria:

◯ Good

Δ Acceptable

X Not acceptable (2) Rub resistance evaluation

Line images of a black ink were made on the same paper as in (1), lines were traced by using a marking pen (ZEBRA fluorescent OPTEX/aqueous pigment pen), and bleeding of lines was examined by organoleptic tests conducted by ten people. An evaluation was made according to the following criteria:

◯ Good

Δ Acceptable

X Not acceptable

Components 1 to 9 as shown below were prepared. Deionized water was added to each component to make a total amount of 100 g, and respective components were stirred for 30 minutes before dispersion by a ultrasonic homogenizer. Then, coarse components were removed by a centrifugal separator (12,000 rpm, 30 minutes) to prepare final pigment dispersions.

Weight-average molecular weights (Mw) described in the examples and comparative examples are measured by the GPC method.

Component 1: black dispersing liquid using a carboxylic acid-based dispersant

Carbon black #25 (manufactured by Mitsubishi Chemical Corp.) 20 wt %

Sodium polyacrylate (a polymeric dispersant: Mw 3,500) 3 wt %

Component 2: black dispersing liquid using a carboxylic acid-based dispersant
  Carbon black MA-100 (manufactured by Mitsubishi Chemical Corp.) 20 wt %
  Styrene/potassium methacrylate copolymer (a polymeric dispersant: 35/65 mol ratio, Mw 7,000) 4 wt %
Component 3: black dispersing liquid using a carboxylic acid-based dispersant
  Color black FW1 (manufactured by Degussa Corp.) 20 wt %
  Methyl acrylate/lithium acrylate copolymer (a polymeric dispersant: 30/70 mol ratio, Mw 5,000) 3 wt %
Component 4: black dispersing liquid using a carboxylic acid-based dispersant)
  Carbon black MA-100 (manufactured by Mitsubishi Chemical Corp.) 20 wt %
  Styrene/ammonium acrylate/dimethylaminoethyl methacrylate (a polymeric dispersant: 25/60/15 mol ratio, Mw 6,000) 3 wt %
Component 5: black dispersing liquid using a sulfonic acid-based dispersant
  Carbon black MA-100 (manufactured by Mitsubishi Chemical Corp.) 20 wt %
  Formalin condensate of sodium naphthalenesulfonate (a polymeric dispersant: Mw 6,000, sulfonation degree 95%) 3 wt %
Component 6: black dispersing liquid using a sulfonic acid-based dispersant
  Color black FW1 (manufactured by Degussa Corp.) 20 wt %
  Potassium polystyrenesulfonate (a polymeric dispersant: Mw 6,000, sulfonation degree 95%) 3 wt %
Component 7: color dispersion using a carboxylic acid-based dispersant
  C. I. Pigment Blue 15:3 20 wt %
  C. I. Pigment Red 5 20 wt %
  C. I. Pigment Yellow 20 wt %
  3% by weight of lithium polyacrylate (Mw 3,500, sulfonation degree 95%) was added as a polymeric dispersant to the above-mentioned three pigments, respectively.
Component 8: color dispersion using a carboxylic acid-based dispersant
  C. I. Pigment Blue 60 20 wt %
  C. I. Pigment Red 122 20 wt %
  C. I. Pigment Yellow 114 20 wt %
  4% by weight of styrene/potassium methacrylate (Mw 7,000, 35/65 mol ratio) was added as a polymeric dispersant to the above-mentioned three pigments, respectively.
Component 9: color dispersion using a sulfonic acid-based dispersant
  C. I. Pigment Blue 15:3 20 wt %
  C. I. Pigment Red 5 20 wt %
  C. I. Pigment Yellow 14 20 wt %
  3% by weight of formalin condensates of potassium naphthalenesulfonate (Mw 6,000, sulfonation degree 95%) was added to the above-mentioned three pigments, respectively.
Component 10: color dispersion using a sulfonic acid-based dispersant
  C. I. Pigment Blue 60 20 wt %
  C. I. Pigment Red 122 20 wt %
  C. I. Pigment Yellow 1 14 20 wt %
  3% by weight of lithium polystyrenesulfonate (Mw 6,000, sulfonation degree 95%) was added to the above-mentioned three pigments, respectively.
Component 1 1: color dispersion using a sulfonic acid-based dispersant
  C. I. Pigment Blue 60 20 wt %
  C. I. Pigment Red 122 20 wt %
  C. I. Pigment Yellow 114 20 wt %
  3% by weight of styrene/ammonium styrenesulfonate/acrylamide copolymer (Mw 5,000, 5/60/35 mol ratio) was added to the above-mentioned three pigments, respectively.

Example 1

A black ink and color inks were prepared in the following compositions:
Black ink
  Component 1 (carboxylic acid-based dispersion) 25 g
  Glycerin 15 g
  Deionized water was added to make a total amount of 100 g.
  The physical properties of the black ink, result in a surface tension of 64 mN/m, viscosity of 2.1 mPa·s, and pH 10.
Color inks
  Component 9 (sulfonic acid-based color dispersion) 10 g
  Ethylene glycol 15 g
  Anionic surfactant (dialkylsulfosuccinate salt), 0.3 g trade name: Aerosol OT (manufactured by Wako Junyaku K. K.)
  Deionized water was added to make total respective amounts of 100 g.
  The physical properties of these color inks are as follows:
  Cyan: surface tension 38 mN/m, viscosity 2.0 mPa·s, pH 7
  Magenta: surface tension 37 mN/m, viscosity 2.1 mPa·s, pH 7
  Yellow: surface tension 38 mN/m, viscosity 2.0 mPa·s, pH 7
  The inks prepared as described above were subjected to an image quality test and an rub resistance evaluation test. The results thereof are shown in Table 1.

Example 2

Black ink
  Component 2 (carboxylic acid-based dispersion) 25 g
  Glycerin 15 g
  Isopropyl alcohol 3 g
  Deionized water was added to make a total amount of 100 g.
  The physical properties of the black ink, result in a surface tension of 62 mN/m, viscosity of 2.4 mPa·s, and pH 8.
Color inks
  Component 9 (sulfonic acid-based color dispersion) 10 g
  Ethylene glycol 15 g
  Butyl carbitol 5 g
  Methanol 3 g
  Sodium laurylate 0.3 g
  Deionized water was added to make total respective amounts of 100 g.
  The physical properties of these color inks are as follows:
  Cyan: surface tension 37 mN/m, viscosity 2.6 mPa·s, pH 7
  Magenta: surface tension 37 mN/m, viscosity 2.7 mPa·s, pH 7

Yellow: surface tension 36 mN/m, viscosity 2.6 mPa·s, pH 7

The results of the same evaluation as that in Example 1 are shown in Table 1.

Example 3

Black ink
Component 3 (a carboxylic acid-based dispersion) 25 g
Triethylene glycol 15 g
2-pyrrolidone 3 g
Sodium laurylate 0.1 g
Deionized water was added to make a total amount of 100 g.

The physical properties of the black ink, result in a surface tension of 50 mN/m, viscosity of 2.3 mPa·s, and pH 8.5.

Color inks
Component 10 (sulfonic acid-based color 10 g dispersion)
Ethylene glycol 12 g
Butyl carbitol 5 g
Polyoxyethylene alkylether 0.2 g
Deionized water was added to make total respective amounts of 100 g.

The physical properties of these color inks are as follows:
Cyan: surface tension 36 mN/m, viscosity 2.4 mPa·s, pH 7.5
Magenta: surface tension 35 mN/m, viscosity 2.3 mPa·s, pH 7.5
Yellow: surface tension 35 mN/m, viscosity 2.3 mPa·s, pH 7.5

The results of the same evaluation as that in Example 1 are shown in Table 1.

Example 4

Black ink
Component 4 (carboxylic acid-based dispersion) 25 g
Triethylene glycol 15 g
Urea 3 g
Ethanol 3 g
Polyoxyethyleneakyl ether 0.1 g
Deionized water was added to make a total amount of 100 g.

The physical properties of the black ink, result in a surface tension of 48 mN/m, viscosity of 2.3 mPa·s, and pH 8.

Color inks
Component 11 (sulfonic acid-based color 10 g dispersion)
Ethylene glycol 15 g
Butyl carbitol 5 g
Urea 3 g
Ethanol 3 g
Sodium dodecylbenzenesulfonate 0.3 g
Deionized water was added to make total respective amounts of 100 g.

The physical properties of these color inks are as follows:
Cyan: surface tension 35 mN/m, viscosity 2.8 mPa·s, pH 7
Magenta: surface tension 34 mN/m, viscosity 2.8 mPa·s, pH 7
Yellow: surface tension 35 mN/m, viscosity 2.8 mPa·s, pH 7

The results of the same evaluation as that in Example 1 are shown in Table 1.

EXAMPLE 5

Black ink
Component 2 (carboxylic acid-based dispersion) 25 g
Ethylene glycol 15 g
2-pyrrolidone 3 g
Nonionic surfactant (acetylene glycol-based 0.05 g nonionic surfactant), trade name: Surfmol 465 (manufactured by Nisshin Kagaku Kogyo Corp.)
Deionized water was added to make a total amount of 100 g.

The physical properties of the black ink, result in a surface tension of 45 mN/m, viscosity of 2.3 mPa·s, and pH 8.

Color inks
Component 1 1 (sulfonic acid-based color 10 g dispersion)
Ethylene glycol 10 g
Butyl carbitol 5 g
Anionic surfactant (fluorine-based anionic 0.05 g surfactant), trade name: FC 170 C (manufactured by Sumitomo 3M Corp.)
Deionized water was added to make total respective amounts of 100 g.

The physical properties of these color inks are as follows:
Cyan: surface tension 32 mN/m, viscosity 2.2 mPa·s, pH 7
Magenta: surface tension 31 mN/m, viscosity 2.2 mPa·s, pH 7
Yellow: surface tension 31 mN/m, viscosity 2.3 mPa·s, pH 7

The results of the same evaluation as that in Example 1 are shown in Table 1.

Example 6

Black ink
Component 3 (carboxylic acid-based dispersion) 25 g
Propylene glycol 15 g
Acrylic resin emulsion 4 g
Nonionic surfactant (acetylene glycol-based 0.05 g nonionic surfactant), trade name: Surfmol 465 (manufactured by Nisshin Kagaku Kogyo Corp.)
Deionized water was added to make a total amount of 100 g.

The physical properties of the black ink, result in a surface tension of 45 mN/m, viscosity of 2.8 mPa·s, and pH 8.5.

Color inks
Component 9 (sulfonic acid-based color 10 g dispersion)
Ethylene glycol 10 g
Thiodiglycol 5 g
Acrylic resin emulsion 4 g
Anionic surfactant (dialkylsulfosuccinate salt), 0.3 g trade name: Aerosol OT(manufactured by Wako Junyaku K. K.)
Nonionic surfactant (acetylene glycol-based 0.1 g nonionic surfactant), trade name: Surfinol 465 (manufactured by Nisshin Kagaku Kogyo Corp.)
Deionized water was added to make total respective total amounts of 100 g.

The physical properties of these color inks are as follows:
Cyan: surface tension 35 mN/m, viscosity 2.9 mPa·s, pH 7
Magenta: surface tension 36 mN/m, viscosity 2.8 mPa·s, pH 7
Yellow: surface tension 37 mN/m, viscosity 2.8 mPa·s, pH 7

The results of the same evaluation as that in Example 1 are shown in Table 1.

Example 7

Black ink
Component 4 (carboxylic acid-based dispersion) 25 g
Diethylene glycol 15 g
Ethanol 5 g
Ethylenediaminetetraacetic acid (EDTA) 3 g
Sodium laurylate 0.1 g
Deionized water was added to make a total amount of 100 g.

The physical properties of the black ink, result in a surface tension of 50 mN/m, viscosity of 2.0 mPa·s, and pH 8.

Color inks
Component 10 (sulfonic acid-based color 10 g dispersion)
Ethylene glycol 10 g
Thio diglycol 5 g
Butyl carbitol 5 g
2-pyrrolidone 3 g
Nitrilotriacetic acid (NTA) 3 g
Anionic surfactant (fluorine-based anionic 0.05 g surfactant), trade name: FC 129 (manufactured by Sumitomo 3M Corp.)
Deionized water was added to make total respective amounts of 100 g.

The physical properties of these color inks are as follows:
Cyan: surface tension 30 mN/m, viscosity 3.0 mPa·s, pH 7.5
Magenta: surface tension 31 mN/m, viscosity 3.1 mPa·s, pH 7.5
Yellow: surface tension 31 mN/m, viscosity 3.1 mPa·s, pH 7.5

The results of the same evaluation as that in Example 1 are shown in Table 1.

Comparative Example 1

Black ink
Component 2 (carboxylic acid-based dispersion) 25 g
Glycerin 15 g
Isopropyl alcohol 3 g
Deionized water was added to make a total amount of 100 g.

The physical properties of the black ink, result in a surface tension of 62 mN/m, viscosity of 2.4 mPa·s, and pH 8.

Color inks
Component 7 (carboxylic acid-based color 10 g dispersion)
Ethylene glycol 15 g
Butyl carbitol 5 g
sodium laurylate 0.3 g
Deionized water was added to make total respective amounts of 100 g.

The physical properties of these color inks are as follows:
Cyan: surface tension 37 mN/m, viscosity 2.7 mPa·s, pH 8.5
Magenta: surface tension 37 mN/m, viscosity 2.6 mPa·s, pH 8.5
Yellow: surface tension 36 mN/m, viscosity 2.6 mPa·s, pH 8.5

The results of the same evaluation as that in Example 1 are shown in Table 1.

Comparative Example 2

Black ink
Component 4 (carboxylic acid-based dispersion) 25 g
Diethylene glycol 15 g
Urea 3 g
Polyox-yethylenealkyl ether 0.1 g
Deionized water was added to make a total amount of 100 g.

The physical properties of the black ink, result in a surface tension of 48 mN/m, viscosity of 2.3 mPa·s, and pH 8.

Color inks
Component 8 (carboxylic acid-based color 10 g dispersion)
Triethylene glycol 15 g
Butyl carbitol 5 g
Urea 3 g
Sodium dodecylbenzenesulfonate 0.3 g
Deionized water was added to make total respective amounts of 100 g.

The physical properties of these color inks are as follows:
Cyan: surface tension 35 mN/m, viscosity 2.6 mPa·s, pH 7.8
Magenta: surface tension 34 mN/m, viscosity 2.6 mPa·s, pH 7.8
Yellow: surface tension 35 mN/m, viscosity 2.6 mPa·s, pH 7.8

The results of the same evaluation as that in Example 1 are shown in Table 1.

Comparative Example 3

Black ink
Component 5 (sulfonic acid-based dispersion) 25 g
Diethylene glycol 15 g
2-pyrrolidone 3 g
Sodium laurylate 0.1 g
Deionized water was added to make a total amount of 100 g.

The physical properties of the black ink, result in a surface tension of 50 mN/m, viscosity of 2.4 mPa·s, and pH 3.5.

Color inks
Component 10 (sulfonic acid-based color 10 g dispersion)
Ethylene glycol 12 g
Butyl carbitol 5 g
Polyoxyethylenealkylether 0.2 g
Deionized water was added to make total respective amounts of 100 g.

The physical properties of these color inks are as follows:
Cyan: surface tension 36 mN/m, viscosity 2.4 mPa·s, pH 7.5
Magenta: surface tension 35 mN/m, viscosity 2.3 mPa·s, pH 7.5
Yellow: surface tension 35 mN/m, viscosity 2.3 mPa·s, pH 7.5

The results of the same evaluation as that in Example 1 are shown in Table 1.

Comparative Example 4

Black ink
Component 6 (sulfonic acid-based dispersion) 25 g
Ethylene glycol 15 g
2-pyrrolidone 3 g
Isopropyl alcohol 3 g
Nonionic surfactant (acetylene glycol-based 0.05 g nonionic surfactant), trade name: Surfinol 465 (manufactured by Nisshin Kagaku Kogyo Corp.)

Deionized water was added to make a total amount of 100 g.

The physical properties of the black ink, result in a surface tension of 45 mN/m, viscosity of 2.5 mPa·s, and pH 4.5.

Color inks

Component 11 (sulfonic acid-based color 10 g dispersion)

Ethylene glycol 10 g

Butyl carbitol 5 g

Anionic surfactant (fluorine-based anionic 0.05 g surfactant), trade name: FC 170 C (manufactured by Sumitomo 3M Corp.)

The physical properties of these color inks are as follows:

Cyan: surface tension 32 mN/m, viscosity 2.0 mPa·s, pH 7

Magenta: surface tension 31 mN/m, viscosity 2.0 mPa·s, pH 7

Yellow: surface tension 31 mN/m, viscosity 2.0 mPa·s, pH 7

The results of the same evaluation as that in Example 1 are shown in Table 1.

Comparative Example 5

Black ink

Component 5 (sulfonic acid-based dispersion) 25 g

Diethylene glycol 15 g

Ethanol 3 g

Sodium laurylate 0.1 g

Deionized water was added to make a total amount of 100 g.

The physical properties of the black ink, result in a surface tension of 49 mN/m, viscosity of 2.3 mPa·s, and pH 3.5.

Color inks

Component 7 (carboxylic acid-based color 10 g dispersion)

Ethylene glycol 15 g

Thiodiglycol 5 g

Anionic surfactant (dialkylsulfosuccinate salt), 0.3 g trade name: Aerosol OT (manufactured by Wako Junyaku K. K.)

Deionized water was added to make total respective amounts of 100 g.

The physical properties of these color inks are as follows:

Cyan: surface tension 37 mN/m, viscosity 2.7 mPa·s, pH 8.5

Magenta: surface tension 37 mN/m, viscosity 2.6 mPa·s, pH 8.5

Yellow: surface tension 36 mN/m, viscosity 2.6 mPa·s, pH 8.5

The results of the same evaluation as that in Example 1 are shown in Table 1.

Comparative Example 6

Black ink

Component 6 (sulfonic acid-based dispersion) 25 g

Diethylene glycol 15 g

Urea 3 g

Polyoxyethylenealkyl ether 0.1 g

Deionized water was added to make a total amount of 100 g.

The physical properties of the black ink, result in a surface tension of 48 mN/m, viscosity of 2.2 mPa·s, and pH 8.

Color inks

Component 8 (carboxylic acid-based color 10 g dispersion)

Triethylene glycol 15 g

Butyl carbitol 5 g

Urea 3 g

Nonionic surfactant (acetylene glycol-based 0.1 g nonionic surfactant), trade name: Surfinol 465 (manufactured by Nisshin Kagaku Kogyo Corp.)

Deionized water was added to make total respective amounts of 100 g.

The physical properties of these color inks are as follows:

Cyan: surface tension 35 mN/m, viscosity 2.7 mPa·s, pH 7.8

Magenta: surface tension 34 mN/n, viscosity 2.8 mPa·s, pH 7.8

Yellow: surface tension 35 mN/m, viscosity 2.8 mPa·s, pH 7.8

The results of the same evaluation as that in Example 1 are shown in Table 1.

TABLE 1

| | Image quality test | | | Rub resistance evaluation | | | |
| --- | --- | --- | --- | --- | --- | --- | --- |
| Example | FX-L paper | OHP transparencies | Glossy paper | FX-L paper | OHP transparencies | Glossy paper | Remarks |
| 1 | ○ | ○ | ○ | ○ | ○ | ○ | |
| 2 | ○ | ○ | ○ | ○ | ○ | ○ | |
| 3 | ○ | ○ | ○ | ○ | ○ | ○ | |
| 4 | ○ | ○ | ○ | ○ | ○ | ○ | |
| 5 | ○ | ○ | ○ | ○ | ○ | ○ | |
| 6 | ○ | ○ | ○ | ○ | ○ | ○ | |
| 7 | ○ | ○ | ○ | ○ | ○ | ○ | |
| CE 1 | x | Δ | Δ | ○ | ○ | ○ | Color reproduction of |
| CE 2 | x | Δ | Δ | ○ | ○ | ○ | shades not uniform |
| CE 3 | x | ○ | ○ | x | x | x | Black line bleeding |
| CE 4 | x | ○ | ○ | x | x | x | |
| CE 5 | x | Δ | Δ | x | x | x | Color reproduction of |
| CE 6 | x | Δ | Δ | x | x | x | shades not uniform |

CE: Comparative Example

What is claimed is:

1. An inkset, for use in ink jet recording, comprising:
a black ink jet recording ink containing a black pigment, a first polymeric dispersant including a COOH group or the salt thereof, and water; and
a color ink jet recording ink containing a chromatic pigment, a second polymeric dispersant including a $SO_3H$ group or the salt thereof, and water.

2. The inkset according to claim 1, wherein said black pigment is carbon black.

3. The inkset according to claim 1, wherein said first polymeric dispersant is a polymeric compound containing at least one of acrylic acid salts and methacrylic acid salts.

4. The inkset according to claim 3, wherein a weight-average molecular weight of said first polymeric dispersant ranges from 1,000 to 10,000.

5. The inkset according to claim 1, wherein said chromatic pigment comprises at least one of color pigments of cyan, magenta and yellow.

6. The inkset according to claim 1, wherein said second polymeric dispersant is a polymeric compound containing at least one of vinyl sulfonic acid salts, naphthalene sulfonic acid salts, and styrenesulfonic acid salts.

7. The inkset according to claim 6, wherein a weight-average molecular weight of said second polymeric dispersant ranges from 1,000 to 10,000.

8. The inkset according to claim 1, wherein a surface tension of said black ink is from 30 to 65 mN/m at 20° C.

9. The inkset according to claim 1, wherein a surface tension of said color ink is from 20 to 40 mN/m at 20° C.

10. The inkset according to claim 1, wherein a surface tension of said black ink is higher than a surface tension of said color ink.

11. The inkset according to claim 5, wherein a viscosity of each ink is from 1.0 to 8.0 mPa·s.

12. The inkset according to claim 1, wherein a pH value of said black ink is in a range from 8 to 11, a pH value of said color ink is in a range from 6 to 9, and the pH value of said black ink is higher than the pH value of said color ink.

13. An ink jet recording method comprising the steps of:
providing an inkset for use in ink jet recording, wherein said inkset comprises a black ink jet recording ink and a color ink jet recording ink, said black ink jet recording ink contains a black pigment, a first polymeric dispersant including a COOH group or the salt thereof, and water, and said color ink jet recording ink contains a chromatic pigment, a second polymeric dispersant including a $SO_2H$ group or the salt thereof, and water;
providing a recording medium,
discharging, according to recording signals, ink droplets of said black ink jet recording ink from a first orifice to said recording medium, and
discharging, according to recording signals, ink droplets of said color ink jet recording ink from a second orifice to said recording medium.

14. The ink jet recording method according to claim 13, wherein at least one of said steps of discharging comprises a step of using a heating means.

* * * * *